UNITED STATES PATENT OFFICE.

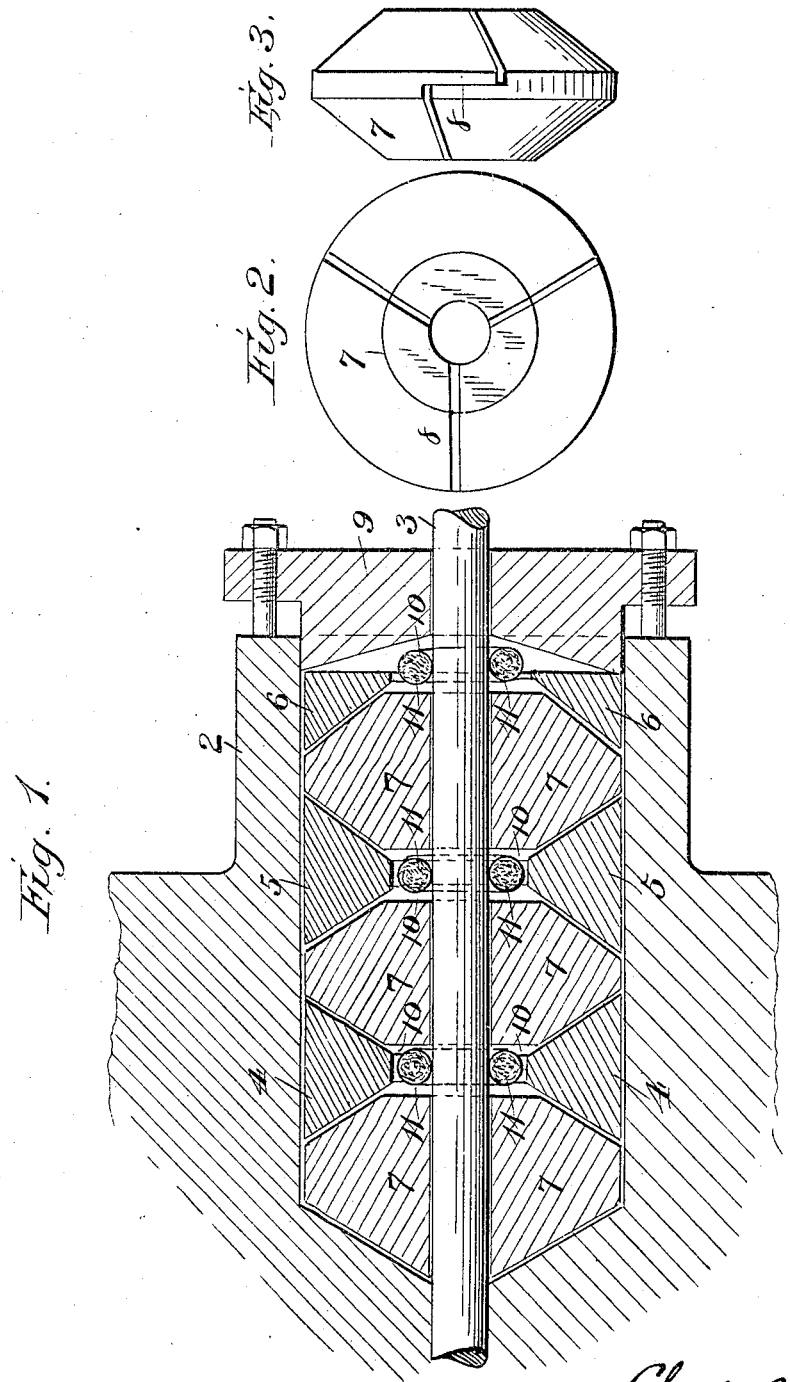

CHARLES C. HAGEMAN, OF LEAVENWORTH, KANSAS.

METALLIC PACKING.

No. 851,746.	Specification of Letters Patent.	Patented April 30, 1907.

Application filed June 4, 1906. Serial No. 320,102.

*To all whom it may concern:*

Be it known that I, CHARLES C. HAGEMAN, a citizen of the United States of America, residing at Leavenworth, in the county of Leavenworth and State of Kansas, have invented certain new and useful Improvements in Metallic Packing, of which the following is a specification.

This invention relates to new and useful improvements in piston rod packing, and it has for an object to provide novel means in combination with the packing for lubricating the rod.

It is also an object of the invention to provide novel means whereby the tightening of the gland will cause the packing rings to approach the piston rod and thereby compensate for the wear thereof.

It is also an object of the invention to so arrange the composition rings that they are spaced one from the other and in said spaces is positioned a lubricating means, said lubricating means being free from pressure.

Finally an object of the invention is to provide a device of the character noted, which will possess advantages in points of simplicity, efficiency and durability, proving at the same time comparatively inexpensive to manufacture.

With the foregoing and other objects in view, the invention consists in the details of construction and in the arrangement and combination of parts to be hereinafter more fully set forth and claimed.

In describing the invention in detail reference will be had to the accompanying drawings forming part of this specification wherein like characters denote like and corresponding parts in the several views, in which—

Figure 1, is a sectional view through the packing box, showing the invention applied. Figs. 2 and 3, are detail views of the packing rings.

In the drawings 2, denotes the packing box and 3, the rod passing therethrough. Arranged within the packing box and bearing against the outer surfaces thereof are the brass rings 4, 5, and 6, which are wedge-shaped in cross section and have their interior surfaces terminating a distance away from the rod 3. It is to be observed that the ring 6, conforms to but one-half of the construction of the remaining two rings, and this is done to meet the requirements of practice. It may be well to state that any number of these rings may be employed as required by the packing box in which they are inserted, but the end ring should always be of the construction of the ring 6, that is, approximately triangular in section, the apex thereof terminating a distance away from the rod 3.

Interposed between the rings 4, 5, and 6, and the inner end of the box 2, are the composition rings 7, which are formed of a plurality of sections provided with the overlapping contacting portions 8, as shown in the detail views 2 and 3. These rings are the packing rings and are formed of a composition of babbitt, block tin and lead. The upper portions of the sides of these rings are truncated and the sides thereof are adapted to contact with the beveled sides of the brass rings. By this arrangement when the gland 9, is screwed into the box, it will contact with the brass rings 6, which in turn will contact with the beveled side of one of the composition rings and so on, which will cause the brass rings 6, 5, and 4, to force the composition rings 7, into contact with the rod 3.

The straight portions of the rings 7, and the ends of the rings 4, 5, and 6, together with the rod form chambers 10, in which are inserted rings 11, of soft fiber packing which are intended to absorb the oil and keep the rod constantly lubricated. This has been found to reduce the friction to a very small percent and this feature has been further enhanced in view of the fact that the fiber rings are entirely free of pressure. In fact, it might be stated that these rings are for the purpose of lubrication only.

It is to be observed that the composition rings of this device are very broad and by this arrangement the necessity of binding springs or wire is obviated as such is fully compensated for by the wedging brass rings.

Having fully described my invention what I claim as new and desire to secure by Letters Patent, is—

In combination, a piston rod, packing rings for embracing same having their upper portions beveled, rings interposed between the packing rings having their sides beveled to coincide with the beveled portions of the packing rings, said second named rings being free on the shaft and fiber rings interposed between the packing rings beneath the second named rings, said fiber rings being free from pressure.

In testimony whereof I affix my signature in the presence of two witnesses this 2nd day of June 1906.

CHARLES C. HAGEMAN.

Witnesses:
W. W. HOOPER,
J. H. ATWOOD.